United States Patent Office  3,155,642  Patented Nov. 3, 1964

3,155,642
CATALYST COMPOSITIONS
Edward W. Duck and Jacques A. Waterman, Amsterdam, Netherlands, assignors to Shell Oil Company, a corporation of Delaware
No Drawing. Filed Apr. 24, 1961, Ser. No. 104,847
Claims priority, application Netherlands, Apr. 29, 1960, 251,099
11 Claims. (Cl. 260—94.3)

This invention relates to catalyst compositions. More particularly, it relates to catalyst compositions that are suitable for the polymerization of conjugated dienes.

It is known that conjugated dienes may be polymerized to produce synthetic elastomers wherein the product has a high proportion of cis 1,4-addition product. Thus, it is known, for example, that isoprene may be polymerized with a catalyst that is the reaction product of an aluminum alkyl or aluminum alkyl halide reacted with a metal halide wherein the metal is selected from Groups IV–VI of the Periodic Table. A representative catalyst in this category is the reaction product of aluminum diethyl chloride and titanium tetrachloride. Still other catalysts are known which will produce cis 1,4-enchainment of conjugated dienes. Those catalysts, however, have the disadvantage of being extremely sensitive to oxygen, moisture, and other impurities so that the polymerization can only be effected after suitable and elaborate steps are taken to exclude atmospheric and other impurities from the system. The present invention provides novel compositions that are suitable as catalysts for the polymerization of conjugated dienes, the catalysts being considerably more insensitive to atmospheric impurities and thereby permits less rigid control of the polymerization process.

It is an object of this invention to provide novel and improved catalysts for the polymerization of conjugated dienes. It is a further object of this invention to provide such catalysts which are more stable and insensitive when exposed to the atmosphere. It is yet another object of this invention to provide such catalysts which are also capable of polymerizing conjugated dienes to produce high proportions of the cis 1,4-addition products. Still other objects will become apparent as the description of this invention proceeds.

These and other objects are accomplished by a composition comprising the reaction product of a halide selected from aluminum chloride and aluminum bromide, a hydrocarbyl polystannane, and a compound of a metal selected from cobalt and nickel. When this composition is employed as a catalyst for the polymerization of conjugated dienes, the above-described objects are obtained.

The stannanes, or hydrocarbyl tin compounds, employed as one of the components for the instant compositions may be represented by the formula

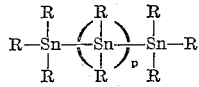

wherein at least one of the R's is an alkyl, cycloalkyl or aryl group and the other R's are similar or dissimilar members selected from the group consisting of alkyl, cycloalkyl, aryl, alkoxy, cycloalkoxy, aryloxy, halogen, hydrogen or alkali metal, and $p$ is selected from 0, 1, 2 and 3. These components, stated alternatively, are hydrocarbyl distannanes, tristannanes, tetrastannanes or pentastannanes. In the more preferred embodiments, these compounds of tin contain one or more alkyl groups having up to 8 carbon atoms each and more preferred all the alkyl radicals are the same. It is advantageous to employ stannanes of the class described which are liquid within the temperature range of 20–80° C. although compounds which are soluble in inert hydrocarbon solvents are also suitable as such compounds may be reacted with the other components while in solution. Representative members of these compounds of tin include hexaalkyl distannanes such as hexaethyl distannane and hexabutyl distannane. Other members include hexaphenyl distannane and dodecamethyl pentastannane. Still other members within this class of compounds are well known, and methods for their preparation are described in Ber. 69B, 1639–42 (1936), J. Am. Chem. Soc. 47 (1925), 2568, and 77 (1955), 5857, and Chemical Reviews 60 (1960), 459–539.

The cobalt and/or nickel compounds are preferably those which are soluble in hydrocarbon solvents and, more particularly, those that are soluble in aromatic solvents such as benzene, toluene, and the like. Particularly preferred are the cobalt or nickel salts of organic acids such as naphthenic acids and aliphatic acids, whether branched, straight-chained, saturated or unsaturated. Also suitable are hydrocarbon soluble complexes of cobalt or nickel halides with amines, such as pyridine, complexes of the halides with alcohols, ketones, aluminum halides such as aluminum chlorides or aluminum alkyl compounds, and the like. The hydrocarbon soluble cobalt or nickel halide complexes may be prepared by mixing and reacting the halide with the complexing compound. Thereafter the solid fraction, if any is present, is separated and the liquid is recovered and used as a component in the instant compositions. The preparation of a typical hydrocarbon soluble complex is described in more detail in Belgium Patent 579,689.

The several components employed in the preparation of the instant compositions may be brought together and reacted in any order. Further, two of the components may be reacted, aged or stored as desired and the remaining component added any time thereafter. It is observed, however, that the compositions are more active catalysts for the polymerization of conjugated dienes when the stannanes and the aluminum halide are reacted first. The reaction of these components preferably is at temperatures ranging from 20–150° C. in the presence of an inert hydrocarbon diluent. Thereafter, the product thus obtained is reacted with the cobalt or nickel compounds. The composition thus prepared is ready for use as a polymerization catalyst although it will be found to be advantageous to react the whole composition further at elevated temperatures for a few minutes. Thereafter, the solid phase, if any exists, is separated. When the composition is to be used for the polymerization of conjugated dienes, a particularly suitable method of procedure is to first react the aluminum halide with the stannane, preferably at elevated temperatures and in the presence of a diluent. The monomer to be polymerized is then contacted with the reaction product under the conditions that cause the monomer to begin polymerization. A suitable polymerization, however, does not occur until the cobalt or nickel compound is added. By this procedure, a very active polymerization catalyst is formed within a few minutes.

The quantity of the various components employed in preparing the novel compositions may vary within wide limits and the amounts that are ultimately used depends upon the selection of the variable involved. Such variables include the choice of monomer that may be polymerized, the polymerization temperature, the choice of cobalt compound or complex, the aging conditions employed for the catalyst preparation, and the like. Since the present invention affords improvements and advantages by reason of the presence of the tin compounds, it will be seen that any amount of the stannanes may be employed. It is useful, however, to express the proportion of the components in terms of a ratio of the sum of aluminum and tin to cobalt and/or nickel, expressed in atoms. Generally, the ratio ranges from about 10:1 to 100,000:1. In the more preferred embodiments of the invention, the ratio of aluminum to tin, expressed in atoms, is between 0.01 and 100, and more preferably between 0.1 and 5. It is an unusual feature of the present invention that compounds of cobalt and nickel which are soluble in inert hydrocarbon solvents, when employed as components in the instant catalyst for the polymerization of conjugated dienes, are surprisingly very active even at very low concentrations. Thus, concentrations that are lower than about 0.5 milliatom of cobalt and/or nickel per liter of solvent are quite active as are amounts as low as 0.01–0.03 milliatom per liter of solvent. For these reasons, it will be seen that considerable economy of catalyst components is an attractive feature of the present invention. Additionally, the small amount of cobalt or nickel that are contained in the soluble form of the catalyst need not be removed from the resulting polymer.

In the preparation of the novel catalysts, any inert organic diluent may be employed. Preferably, the diluent is an inert hydrocarbon solvent which may be aliphatic, cycloaliphatic or aromatic. These include, for example, hexane, iso-octane, cyclohexane, benzene, toluene, and the like. When used for the polymerization of conjugated dienes, the diluent employed for the catalyst preparation should be the same as the diluent used in the polymerization. It is observed that the nature of the diluent may have a substantial effect on the rates of diene polymerization. For example, butadiene polymerizations proceed more rapidly in aromatic mediums than in aliphatic ones. On the other hand, isoprene polymerizations proceed more rapidly in aliphatic mediums rather than in aromatic mediums.

When used to polymerize conjugated dienes, the polymerization temperatures range from about −20 to about 150° C., and more particularly from about 0 to about 70° C. In the case of normally gaseous dienes, elevated pressures may be required in the range of 1 to 5 atmospheres. With normally liquid dienes, elevated pressures normally are not essential. In any case, it is particularly useful to conduct the polymerization in closed reactors and thereby prevent the escape of monomer. An inert atmosphere, while not being wholly necessary, is preferred as the polymerization proceeds more rapidly and produces products having a higher cis 1,4-content.

Various embodiments of the present invention are described in the following examples, which are intended for purposes of illustration only.

Example I

To a 100 ml. reactor, from which air is displaced by dry, oxygen-free nitrogen, is added 0.82 mmole of aluminum chloride, and 5.45 mmoles of hexaethyl distannane. These two components are then reacted for four minutes in a steam bath in the absence of solvent. To the reactor is then added cobalt naphthenate in 50 ml. of benzene in an amount to give 2.3 milliatoms per liter of cobalt. The reactor is then cooled and butadiene is fed in. Polymerization begins almost immediately. The resulting polymer is precipitated by the addition of isopropanol, filtered, washed with fresh isopropanol, and dried in vacuo at 60° C. The rate of polymerization is 216 gm./liter-hour and the cis 1,4-content is 89.5%. The polymerization temperature is 25° C. and the time is 10 minutes.

Examples II–IV

The procedures of Example I are repeated with the following amounts of catalyst components and the resultant cis 1,4-content of polybutadiene.

| $AlCl_3$, mmole/li. | $Sn_2Et_6$, mmole/li. | Co Naphthenate, matom Co/li. | Benzene, ml. | Temp., °C. | Time, min. | Rate, g./li.-hr. | Cis 1,4-content, percent |
|---|---|---|---|---|---|---|---|
| 22.6 | 36.4 | 2.0 | 50 | 25 | 4 | 1,368 | 94.7 |
| 14.6 | 10.6 | 0.44 | 61.9 | 0 | 10 | 70 | 87.1 |
| 25.2 | 13.5 | 0.70 | 53.8 | 16 | 6 | 621 | 93.2 |

Example V

The procedures of Example I are repeated except that an equimolar amount of aluminum bromide replaces the aluminum chloride. The resultant catalyst is also very active, but the cis 1,4-content of the polybutadiene is slightly reduced.

Example VI

Following the procedure of Example I, hexabutyl distannane in an equimolar amount replaces the hexaethyl distannane. The resulting catalyst produces essentially the same product as in Example I but the catalyst is slightly less active.

Examples VII–X

A series of catalysts are prepared to illustrate the general suitability of hydrocarbon soluble cobalt compounds and complexes for the polymerization of conjugated dienes. The various hydrocarbon soluble compounds of cobalt and an indication of their activity are given below. In all cases, the other catalyst components are aluminum chloride and hexaethyl distannane used in the same amounts as in Example II. The cobalt compound is used in an amount to give 2.0 atoms of cobalt per liter.

| Compound | Rate of Polymerization, gm./li.-hr. | Cis 1,4-Content |
|---|---|---|
| $CoCl_2$-$AlCl_3$ complex | 1,200 | 96.4 |
| Co acetylacetonate | 1,285 | 96.0 |
| Co oleate | 1,120 | 97.2 |
| Co propionate | 1,280 | 96.0 |
| $CoCl_2$-pyridine complex | 1,180 | 95.8 |
| $CoCl_2$-acetone complex | 1,220 | |

In a similar manner, the corresponding nickel compounds are equally suitable, but it will be observed that the corresponding nickel compounds generally have the effect of increasing the polymerization rate although the cis-1,4-content is very slightly reduced.

From the above examples, it will be seen that the novel compositions of this composition are capable of wide variation, not only in relation to the individual components employed but their respective amounts. Furthermore, the conjugated diene which may be used to ultimately be polymerized by the instant composition may also be varied but, in general, the instant compositions are more suitable for the polymerization of butadiene and isoprene. In the case of isoprene polymerizations, the cis 1,4-content is considerably lower and such materials are highly suitable for blending with other synthetic and natural elastomers to produce useful rubber products. Still other modifications will be apparent to persons skilled in the art.

Examples XI–XIX

Comparative experiments were carried out in 100-ml. reactors from which the air had been expelled by dry oxygen-free nitrogen. Catalyst components as indicated in the following table were introduced in these reactors.

Wherever AlCl₃ together with a tin compound was used, these two components were pre-mixed without diluent and the mixture formed from these two components was heated for 4 minutes over a steam bath. The cobalt or nickel compound was invariably the last component added. It was added in advance to benzene at room temperature. Immediately after the addition of the cobalt or nickel compound the reactors were placed in a cooling bath and butadiene was passed through. In the experiments in which the process was carried out according to the invention polymerization set in almost immediately.

The mixtures were invariably kept substantially saturated with butadiene till the end of the experiment. The resultant polymer was finally precipitated by the addition of isopropanol, filtered, washed with fresh isopropanol and dried in vacuo at 60° C.

alkyl complexes, the atomic ratio of the sum of aluminum and tin to said third metal being between about 10 and 100,000 and the atomic ratio of aluminum to tin being about 0.01 and 100.

2. The reaction product of an aluminum halide selected from the group consisting of aluminum chloride and aluminum bromide, a hydrocarbyl stannane of the formula

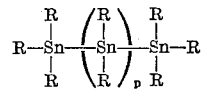

wherein at least one R is selected from the group consisting of alkyl, cycloalkyl and aryl and the other R's are selected from the group consisting of alkyl, cycloalkyl, aryl, alkoxy, cycloalkoxy, aryloxy, halogen, hydrogen, and alkali metal and $p$ is selected from 0, 1, 2 and 3 and a hydrocarbon soluble compound of a third metal

| No. | AlCl₃, mmol/l. | Sn-compound | | Cobalt or nickel compound | | Benzene volume, ml. | Polymerization conditions | | Polymerization rate, g./l. h. | Composition of polymer | | |
|---|---|---|---|---|---|---|---|---|---|---|---|---|
| | | Type | Mmol/l. | Type | Mmol/l. | | Time, min. | Bath temp., °C. | | Cis, percent | Trans, percent | 1,2, percent |
| XI | 25 | n.C₈H₁₇-Sn(C₂H₅)₂—Sn(C₂H₅)₂-n.C₈H₁₇ | 15 | CoCl₂ | 2 | 350 | 60 | 10-15 | 115 | 90.6 | 6.1 | 3.3 |
| XII | 20 | n.C₈H₁₇-Sn(C₂H₅)₂—Sn(C₂H₅)₂-n.C₈H₁₇ | 15 | Co-2-ethyl-hexoate | 1 | 350 | 60 | 10-15 | 135 | 90.4 | 7.4 | 2.2 |
| XIII | 15 | (C₂H₅)₃Sn—Sn(C₂H₅)₃ | 30 | ...do... | 2 | 50 | 15 | 25 | 218 | 91.2 | 5.3 | 3.5 |
| XIV | 15 | (C₂H₅)₃Sn—Sn(C₂H₅)₃ | 30 | NiCl₂ | 2 | 50 | 15 | 25 | 43 | 76.0 | 20.4 | 3.6 |
| XV | 15 | (C₆H₅)₃Sn—Sn(C₆H₅)₃ | 30 | Co-2-ethyl-hexoate | 2 | 50 | 15 | 25 | 191 | 91.9 | 4.8 | 3.3 |
| XVI | 20 | (C₂H₅)₃Sn(C₂H₅)₂—Na | 30 | ...do... | 2 | 50 | 15 | 25 | 95 | 87.1 | 8.4 | 4.5 |
| XVII | 20 | Na—Sn(C₂H₅)₂—Sn(C₂H₅)₂—Na | 30 | ...do... | 2 | 50 | 15 | 25 | 97 | 88.0 | 7.8 | 4.2 |
| XVIII | 20 | Cl—Sn(C₂H₅)₂—Sn(C₂H₅)₂—Cl | 30 | ...do... | 2 | 50 | 15 | 25 | 27 | 84.6 | 6.9 | 8.5 |
| XIX | 37 | (C₂H₅)₃Sn—Sn(C₂H₅)₂—H | 88 | Co-naphthenate | 2 | 50 | 15 | 0 | 56 | 95.3 | 2.2 | 2.5 |

We claim as our invention:

1. The reaction product of an aluminum halide selected from the group consisting of aluminum chloride and aluminum bromide, a hydrocarbyl stannane of the formula

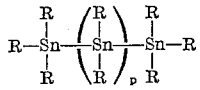

wherein at least one R is selected from the group consisting of alkyl, cycloalkyl and aryl and the other R's are selected from the group consisting of alkyl, cycloalkyl, aryl, alkoxy, cycloalkoxy, aryloxy, halogen, hydrogen, and alkali metal, and $p$ is selected from 0, 1, 2 and 3 and a compound of a third metal selected from the group consisting of cobalt and nickel, said third metal compound being salts and complexes of the group consisting of halides, carboxylates, halide-amine complexes, halide-alcohol complexes, halide-ketone complexes, halide-aluminum chloride complexes and halide-aluminum alkyl complexes, the atomic ratio of the sum of aluminum and tin to said third metal being between about 10 and 100,000 and the atomic ratio of aluminum to tin being between about 0.01 and 100.

3. The product of claim 1 wherein the aluminum halide is aluminum chloride.

4. The product of claim 1 wherein the stannane is hexaethyl distannane.

5. The product of claim 1 wherein the stannane is hexabutyl distannane.

6. The product of claim 2 wherein the hydrocarbon soluble compound is cobalt naphthenate.

7. The product of claim 1 wherein the cobalt compound is cobalt acetylacetonate.

8. The product of claim 2 wherein the hydrocarbon soluble compound is a complex of cobalt chloride and aluminum chloride dissolved in benzene.

9. The product of claim 1 wherein the cobalt compound is a complex of cobalt chloride and pyridine.

10. The product of claim 1 wherein the cobalt compound is a complex of cobalt chloride and acetone.

11. In the process for the polymerization of a conjugated diene of the group consisting of butadiene and isoprene at temperatures in the range from about −20° C. to 150° C., the invention comprising carrying out the polymerization in the presence of a polymerization catalyst according to claim 1.

References Cited in the file of this patent

UNITED STATES PATENTS

| | | |
|---|---|---|
| 2,898,330 | Isbenjian | Aug. 4, 1959 |
| 3,026,269 | Gresham et al. | Mar. 20, 1962 |
| 3,030,350 | De Jong et al. | Apr. 17, 1962 |
| 3,036,016 | Gordon et al. | May 22, 1962 |